US012623897B1

(12) United States Patent
Ward et al.

(10) Patent No.: US 12,623,897 B1
(45) Date of Patent: May 12, 2026

(54) CLEAN IN PLACE SYSTEM FOR A BEVERAGE DISPENSER

(71) Applicants: Peter Ward, Tulsa, OK (US); David James Keener, Tulsa, OK (US)

(72) Inventors: Peter Ward, Tulsa, OK (US); David James Keener, Tulsa, OK (US)

( * ) Notice: Subject to any disclaimer, the term of this patent is extended or adjusted under 35 U.S.C. 154(b) by 18 days.

(21) Appl. No.: 18/384,452

(22) Filed: Oct. 27, 2023

Related U.S. Application Data

(63) Continuation-in-part of application No. 18/081,866, filed on Dec. 15, 2022.

(60) Provisional application No. 63/290,490, filed on Dec. 16, 2021.

(51) Int. Cl.
*B67D 1/07* (2006.01)

(52) U.S. Cl.
CPC .......... *B67D 1/07* (2013.01); *B67D 2001/075* (2013.01)

(58) Field of Classification Search
None
See application file for complete search history.

(56) References Cited

U.S. PATENT DOCUMENTS 9,797,652 B1 * 10/2017 Wilkerson ............ F25D 31/002
2021/0347624 A1 * 11/2021 Newton ............... B67D 1/0051

* cited by examiner

*Primary Examiner* — Eric W Golightly
(74) *Attorney, Agent, or Firm* — Head, Johnson, Kachigian & Wilkinson, PC

(57) ABSTRACT

A system and method to automatically clean the lines of a beverage dispenser system by purging the beverage lines, then cleaning with detergent, purging again, sanitizing, and recharging the lines. The present invention has a series of reservoirs, pumps and solenoid operated valves all run by an automated controller which carries out the cleaning process without human intervention.

10 Claims, 3 Drawing Sheets

CLEAN IN PLACE SYSTEM FOR A BEVERAGE DISPENSER

CLAIM OF PRIORITY

The present application is a Continuation in Part Application of U.S. Non-Provisional patent application Ser. No. 18/081,866, filed on Dec. 15, 2022, entitled a Clean In Place System For A Beverage Dispenser which claims the priority to U.S. Provisional Patent Application No. 63/290,490, filed on Dec. 16, 2021, entitled a Clean in Place System For A Beverage Dispenser, which is incorporated herein by reference.

FIELD OF THE INVENTION

The present invention relates generally to a beverage dispenser system. More particularly, the present invention relates to a clean in place system for a beverage dispenser.

BACKGROUND OF THE INVENTION

Consumers are becoming more accustomed to an increasing array of premium flavored beverages. These beverages range from hot and cold coffees infused with nitrogen and cream-based flavoring to flavored teas and a wide range of premium beers. Regardless of the type of beverage, the dispenser must be maintained. One of the most neglected parts of this maintenance is cleaning the supply lines. These are the conduits which carry the beverage from their storage reservoir to the dispensing head. They often run from a refrigerated storage reservoir through an ambient temperature area to the dispensing head.

Ideally these lines should be cleaned every few days. The exact interval between cleaning depends on a number of factors such as the type of beverage, sugar content, dairy content, hardness of the water used, temperature of the beverage and ambient temperature. If cleaning maintenance is delayed or ignored the taste and texture of these beverages can be negatively impacted. In extreme cases it can become a health issue and/or prevent the efficient operation of the dispenser.

Manual cleaning of these lines requires a significant amount of labor to carry out the various steps. In a complete cleaning the line is purged with water. The line is then charged with a detergent solution, also known as a detergent, which is allowed to sit in the line to loosen and remove lime deposits. Next the line is rinsed with water to remove the loosened debris. The line is then charged with a sanitizing solution which is allowed to sit in the line to kill any germs and bacteria. The sanitizer is then rinsed from the line with water. Finally, the line is recharged with beverage prior to being put back in service.

As can be imagined it takes a significant amount of time and effort to ensure these steps are carried out and the lines are properly cleaned. Most dispensers typically have several lines so that labor is further increased. What is needed, therefore, is a system that can automatically clean and sanitize these beverage dispensers without constant human intervention.

BRIEF SUMMARY OF THE INVENTION

The present invention achieves its objections by providing a system and method to automatically clean these lines by purging the beverage lines, then cleaning with detergent, purge again, sanitize, and recharge the lines. The exact cleaning sequence may vary depending upon product dispensed, product temperature, ambient temperature and various other service conditions. The present invention has a series of reservoirs, pumps and solenoid operated valves all run by an automated controller which carries out the cleaning process without human intervention.

While the present invention can be used on any number of beverage dispensing systems, it is explained here on a system that dispenses a nitrogen infused beverage. Likewise, it can be used on hot or cold beverages dispenser. Often the difference between a hot or cold dispenser is the presence of a flash heater near the dispensing head. The flash heater raises the temperature of the beverage to an acceptable temperature for a "steaming" cup of coffee, cocoa or tea just prior to it being dispensed into a cup or other serving container.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT(S)

The present invention is a system and method for automatically cleaning the supply lines on a beverage dispenser 20. Such dispensers 20 could have a single dispensing head or multiple dispensing heads 22. Similarly, it could be used to dispense hot or cold beverages. These could be uncarbonated, carbonated or infused with other gases such as nitrogen. In short, the present invention should not be viewed to be limited to a specific type of beverage or beverage dispenser system 20. For illustration purposes the present invention is described on a beverage dispenser system 20 with nitrogen infusion.

Figure 1:
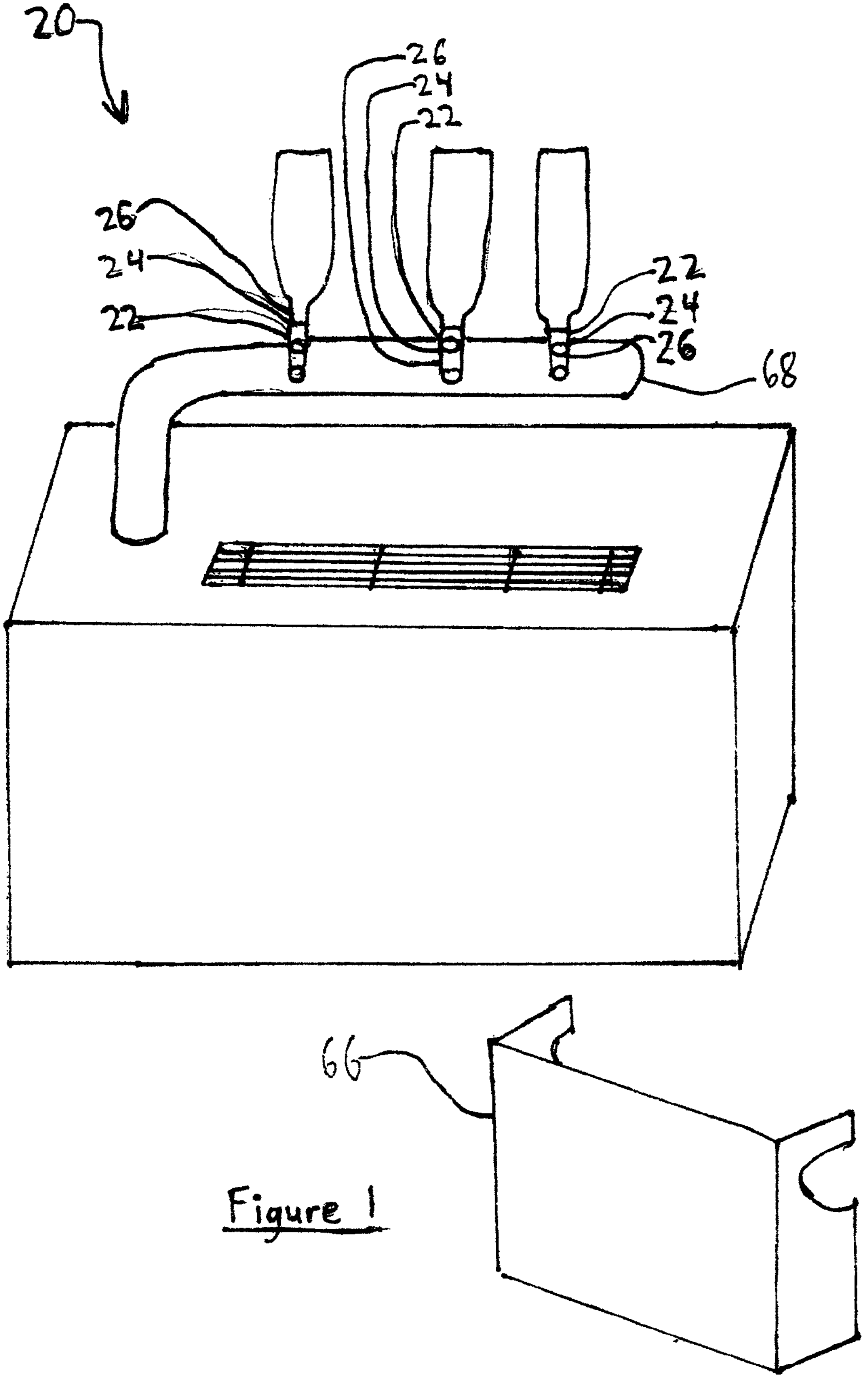
FIG. 1 is a perspective view of a beverage dispenser system with the preferred embodiment of the present invention.
Figure 2:
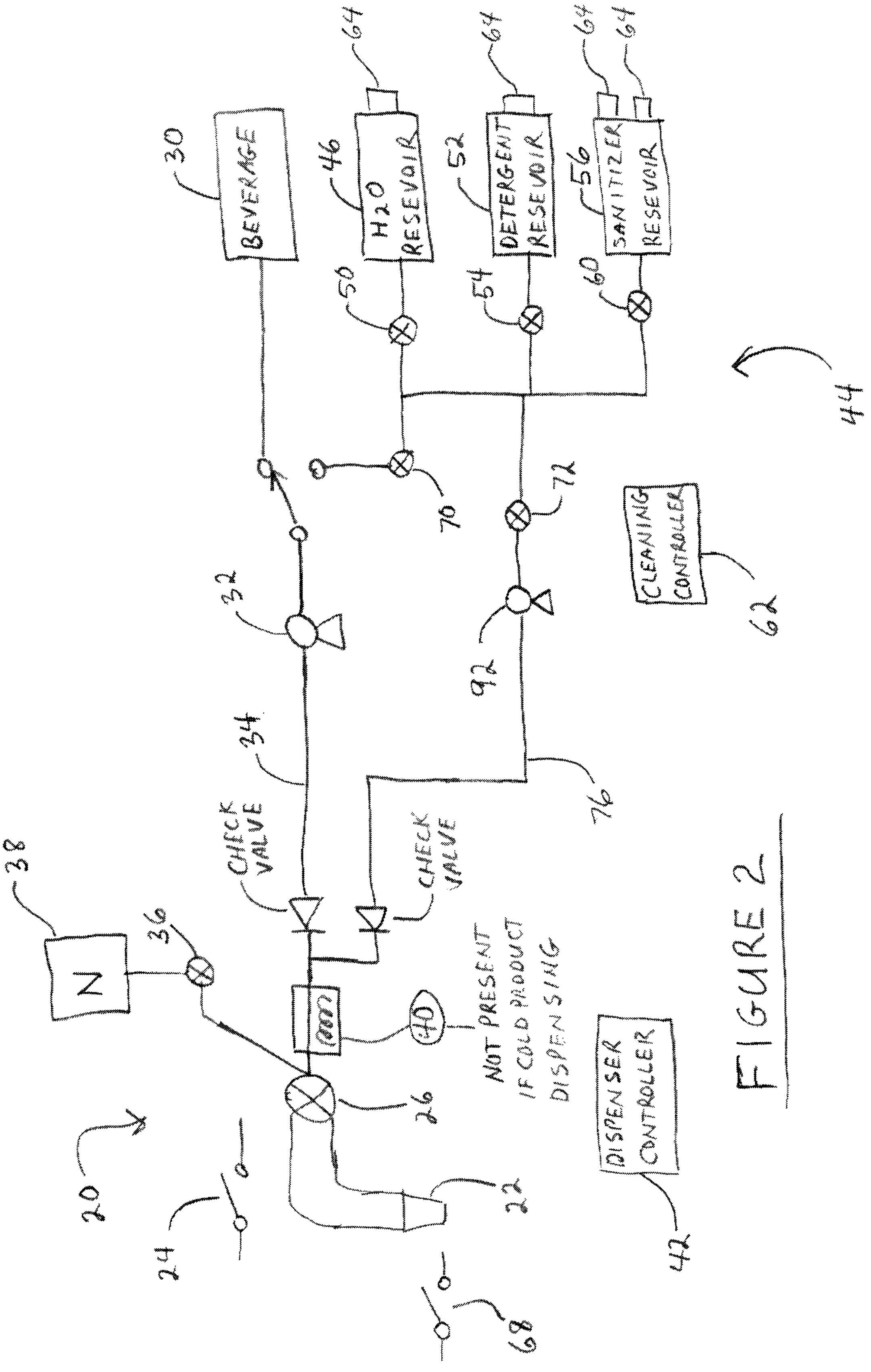
FIG. 2 is a schematic of one dispensing head and its related equipment.

Turning now to the drawings wherein like reference characters indicate like or similar parts throughout, FIG. 1 is a perspective view of a dispenser system 20 with the preferred embodiment of the present invention. The dispenser system 20 has one or more dispensing heads 22. FIG. 2 provides a schematic of the preferred embodiment of the present invention installed on a single beverage dispensing head 22. The present invention can be tied to multiple dispensing heads 22 on beverage dispenser system 20.

In the preferred embodiment the dispenser system 20 has a plurality of dispensing heads 22. Each head 22 has a head switch 24, a solenoid operated head valve 26, a cleaning isolation valve 70, a beverage reservoir 30, a beverage pump 32, a dispensing conduit 34 and a nitrogen injector 36. The controller dispenser 42 is configured such that when the head switch 24 is depressed the head valve 26 opens and the beverage pump 32 begins to operate. This places the beverage reservoir 30 in fluid communication with the dispensing conduit 34 and allows the beverage to flow from the beverage reservoir 30 and out the dispensing head 22.

If equipped for a nitrogen infused beverage, the nitrogen injector 36 is opened after a predetermined timed delay (typically less than one second). This puts the head valve 26 in fluid communication with a nitrogen supply 38 and allows nitrogen to be injected into the beverage flowing through the dispensing beverage valve 26.

If the dispensing head 22 is for dispensing a hot beverage it will also be equipped with a flash heater 40 In use, this heater is in line with the dispensing head valve 26 and heats all fluids flowing through it to the beverage head valve 26.

In the preferred embodiment, beverage dispensing operation of the dispenser system 20 is controlled by dispenser controller 42 which is configured to receive a start signal from the head switches 24 and run the solenoid operated valves 26, and the nitrogen injectors 36. The predetermined length of time of delays for operation of the various components is programmed into the dispenser controller 42.

The present invention improves to the beverage dispensing system 20 by adding a clean in place system 44 which automatically rinses, cleans, sanitizes and recharges the dispensing conduit 34. In the preferred embodiment the clean in place system 44 has cleaning isolation valves 70, water supply 46, solenoid operated water valve 50, a detergent reservoir 52 and a solenoid operated detergent valve 54, a sanitizer reservoir 56, a solenoid operated sanitizer valve 60 and a cleaning controller 62.

In the preferred embodiment once the cleaning controller 62 is activated the head switches 24 and the nitrogen injection control solenoid 36 on the dispenser system 20 are disabled or otherwise locked out of operation. The cleaning controller 62 communicates with the dispenser controller 42 and the head switches 24 are disabled or otherwise locked out of operation. A level sensor 64 on the water reservoir 46 and a level sensor 64 on the detergent reservoir 52 are used to confirm they are full and if not, they are filled before start of cleaning. Two level sensors 64 are used to verify the sanitizer reservoir 56 is empty before start of cleaning and is filled upon start of cleaning. Sanitizer reservoir 56 has an empty and a full level sensor 64. Sanitizer reservoir 56 is kept empty because the mixed sanitizer solution is not shelf stable for more than a few hours. The sanitizer reservoir 56 is filled upon cleaning initialization. The nitrogen injection control solenoid 36 is disabled or locked out by the dispenser controller 42 upon initialization of cleaning process controlled by the cleaning controller 62. The dispensing conduits 34 preferably go through the cleaning process individually. All conduits are sequentially flushed with water, then all conduits are sequentially cleaned with detergent, then all conduits are sequentially sanitized, then all conduits are sequentially recharged with product. However, the cleaning system 44 could be configured to do any of the processes of flush, detergent, sanitize, and recharge simultaneously on multiple conduits 34.

The dispensing conduits 34 are then purged by flushing them with water for a predetermined length of time. This is accomplished by opening the head valve 26 on the conduits 34 to be flushed and opening the corresponding operated cleaning isolation valve 70 and the operated water valve 50.

Once the dispenser conduits 34 are purged they are cleaned with a detergent. This is accomplished by opening the head valve 26 on the conduits 34 to be cleaned and opening the corresponding operated cleaning isolation valve 70 and the operated detergent valve 54. Once the dispensing conduits 34 are charged with detergent, head valve 26, solenoid operated detergent valve 54, and the corresponding operated cleaning isolation valve 70 are closed and the detergent is allowed to sit in the dispensing conduit 34 for a predetermined length of time, preferably 5 to 15 minutes.

The dispensing conduits 34 are then purged of the detergent with water. This is accomplished by opening the head valve 26 on the conduits 34 to be flushed and opening the corresponding operated cleaning isolation valve 70 and the operated water valve 50 for a predetermined length of time.

It should be noted that the detergent cleaning step, with exception of periodic preventative maintenance cleaning, is only used to clean heated components of the system which encompasses all components of the dispenser system 20 if it is a heated product dispenser. Separate cleaning of the heated components of the dispenser system is accomplished by utilizing the short hot loop 76, the half hot pump 92, and the operated short hot cleaning isolation solenoid valve 72. Detergent use on non-heated components of the system may be done at any time, but is typically done on a preventative maintenance schedule which may be, but not limited to every six months. In the operational cycles when it is not included, the clean in place system 44 simply proceeds from the initial step of purging the product in the dispensing conduits 34 with water to filling the conduits 34 with sanitizer as discussed below. The dispensing conduits 34 are then sanitized. This is accomplished by opening the head valve 26 on the conduits 34 to be flushed and opening the corresponding operated cleaning isolation valve 70 and the operated sanitizer valve 60 for a predetermined length of time. Once the dispensing conduits 34 are charged with sanitizer the head valve 26 and the corresponding operated cleaning isolation valve 70 and the operated sanitizer valve 60 are closed and the sanitizer is allowed to sit in the dispensing conduit 34 for a predetermined length of time, preferably 5 to 15 minutes.

The dispensing conduit 34 is then recharged with beverage. The recharge process serves to purge the conduits 34 of sanitizer in addition to recharging with beverage product. This is done by opening the head valve 26 for a predetermined length of time. This length of time may vary but should be sufficiently long enough to purge the sanitizer remaining in the dispensing conduit 34.

The steps of the cleaning cycle may be changed dependent upon the cleaning needs. This may include not using detergent on non-heated components of the system.

Control and operation of the various solenoid operated valves, pumps and reading of the level sensors during the cleaning process is done by the cleaning controller 62. In the preferred embodiment cleaning controller 62 is placed in communication with each of the dispenser controllers 42 using RS485 communications cabling and related protocols. However, this could be carried out by other means and still be within the scope of the present invention.

The cleaning system 44 can be set to run various programs or cleaning routines which can vary the length of time the detergent and sanitizer are pumped into and/or held in the dispensing conduit 34 as well as the predetermined length of time water is allowed flow through the dispensing conduit 34 while rinsing or purging. Thus, the cleaning controller 62 may have several cleaning programs or modes providing a range of cleaning options such as a quick clean cycle or a longer more thorough deep clean cycle.

The cleaning system 44 may also include a shield 66 which can be secured to the front of the dispenser system 20 blocking access to the dispensing heads 22. This prevents employees and customers from interrupting the cleaning system 44 while it is running a cleaning cycle. Further this dispenser system 20 may be equipped with an isolation switch 68 that is triggered when a cleaning shield 66 is put in place. In the preferred embodiment the isolation switch 68 triggers the dispenser controller 42 when the shield 66 is put in place. The dispenser controller 42 then prevents operation of the head switches 24 and the nitrogen solenoid 36 on the dispenser system 20 and communicates shield in place status to the to the cleaning controller 62 in preparation of a cleaning cycle.

Figure 3:
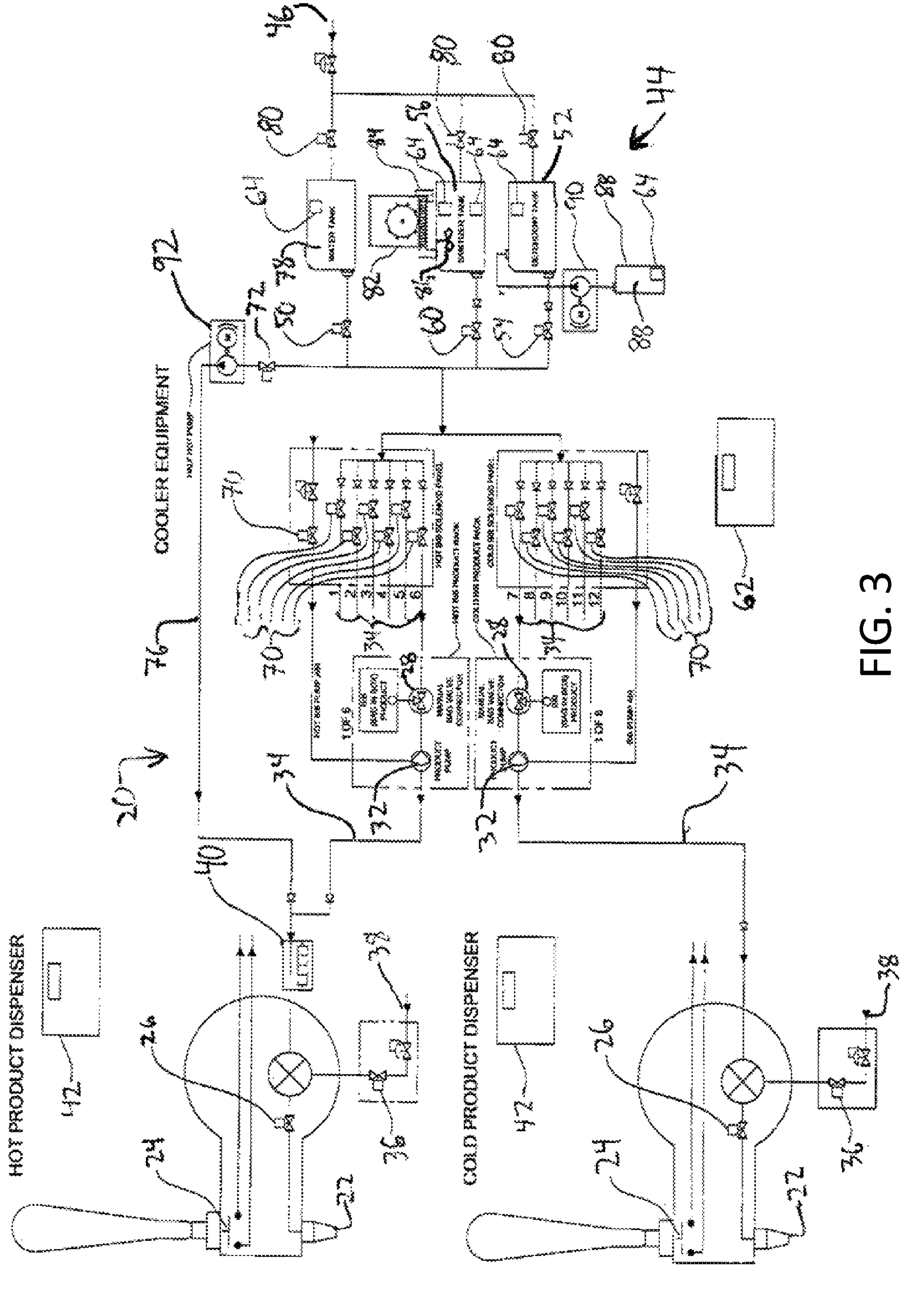
FIG. 3 is a schematic of an alternate embodiment cleaning system.

In one embodiment the isolation switch 68 is a magnetically operated reed switch and the shield is a ferrous metal. The isolation switch 68 is located on the dispenser system 20 such that when the shield 66 is put in place the isolation switch 68 is triggered by a portion of the shield 66. FIG. 3 shows a second embodiment of the inline cleaning system of the present invention coupled to a twelve line beverage dispensing system 20 (six hot dispensers and six cold dispensers). Each dispensing conduit 34 is isolated from the cleaning system 44 by its own solenoid operated cleaning isolation valve 70. The cleaning isolation valves 70 remain closed unless operated to clean the line in the manner previously discussed. In the preferred embodiment the dispensing conduits 34 are cleaned individually.

The preferred embodiment of the present system 44 automates the operation of the water supply 46. The rinse water reservoir 46, sanitizer reservoir 56 and detergent reservoir 52 each have a solenoid operated water supply valve 80 which isolates the water supply 46 from the respective reservoirs 52, 56 and 46. Water can be added to any of these reservoirs 52, 56 and 46 by opening their respective water supply valve 80. The reservoirs 52, and 46 are equipped with one level sensor 64 and reservoir 56 is equipped with two level sensors 64.

Level sensors 64 communicate liquid level indication of a reservoir 46, 52, or 56 to the cleaning controller 62. If a reservoir 46, 52, or 56 is equipped with one level sensor 64, that level sensor 64 will be near the top of the reservoir 46, 52, or 56 and used to indicate a full status to the cleaning controller 62 and if two level sensors 64 are utilized, a second level sensor 64 will be near the bottom of the reservoir 46, 52, or 56 and used to indicate an empty status to the cleaning controller 62.

The sanitizer reservoir 64 is connected to a sanitizer storage bin 82 with an auger mechanism 84 which can be operated to push a powdered sanitizer from the storage bin 82 into the sanitizer reservoir 56. The sanitizer reservoir 56 may be equipped with an agitator 86 which is operated while powdered sanitizer and water are being added to the sanitizer reservoir 56. Operation of the agitator 86 ensures an even and homogenous mixture of sanitizer. Operation of the water supply valve 80, auger mechanism 84 and agitator 86 are controlled by the cleaning controller 62. The cleaning controller 62 may operate the auger mechanism 84 and agitator 86 when water is added to the sanitizer reservoir 64. By running the auger mechanism 84 for a predetermined amount of time, the cleaning controller 62 can provide a precise and predetermined amount of sanitizer into the sanitizer reservoir 56 to meet the desired sanitizer concentration level in the reservoir.

The detergent reservoir 52 is connected to a container of detergent concentrate 88 through a detergent concentrate pump 90. When detergent reservoir 52 is being filled via the water supply valve 80 and the water level reaches the reservoir full level sensor 64, the water supply valve 80 is turned off and the detergent concentrate pump 90 is turned on for a predetermined amount of time to dispense the proper amount of concentrate into the reservoir 52 to provide the necessary mixed detergent solution. The detergent concentrate container 88 may also be equipped with one or more level sensors 64 monitored by the cleaning controller 62 to determine when it needs to be refilled.

The cleaning system 44 may also be equipped with a short hot cleaning loop 76 which is isolated from the cleaning system by a solenoid operated short hot cleaning isolation valve 72. In the preferred embodiment a hot beverage dispenser system 20 has its own short hot cleaning loop 76 and a series of check valves (no number on drawing) allowing for a cleaning of just the hot beverage dispenser system components They clean the dispensing heads 22, including flash heater, without having to purge, clean and refill the dispensing conduit 34 of the respective dispensing head 22. This greatly reduces product loss due to avoiding emptying the dispensing conduit 34 while still cleaning the more dirt prone area of the hot dispenser head 22 with its heater 40.

The short hot cleaning loop 76 injects the rinse water, detergent and sanitizer directly into the heaters of the hot product dispenser 20 from the cleaning system 44 by opening the short hot cleaning isolation valve 72 and turning on the half hot pump 92. During the short hot cleaning cycle, the dispensing head 22 is initially flushed with water. It is then charged with detergent. The detergent is allowed to dwell or sit in the dispensing head 22. The dispensing head 22 is then flushed with water and then charged with sanitizer which is also allowed to dwell in the dispensing head 22. The dispensing head 22 is then recharged with beverage product which serves to rinse the sanitizer out while recharging with product. The operation of the short hot loop is done by the cleaning controller 62. The dispensing heads 22 are preferably cleaned one at a time.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A line cleaning system for a beverage dispenser, said line cleaning system comprising:

a beverage dispenser system with a plurality of dispensing heads each head having a beverage reservoir, a dispensing conduit, a head valve, a solenoid operated cleaning isolation valve and a beverage pump and a head switch configured to operate the head valve, the solenoid operated cleaning isolation valve, and the beverage pump, wherein upon activations of the head switch the dispensing conduit is placed in fluid communication with the dispensing head, the solenoid operated cleaning isolation valve, the beverage reservoir and the beverage pump;

a detergent reservoir, and solenoid operated detergent valve, all in fluid communication with each dispensing head, the solenoid operated detergent valve configured to selectively isolate the detergent reservoir from the dispensing conduit;

a sanitizer reservoir, and solenoid operated sanitizer valve, all in fluid communication with each dispensing head and the solenoid operated sanitizer valve configured to selectively isolate the sanitizer reservoir and pump from the dispensing heads;

a nitrogen reservoir;

a plurality of nitrogen injectors, each nitrogen injector in fluid communication with the nitrogen reservoir, each dispensing head in fluid communication with one of the nitrogen injectors, the nitrogen injectors being configured to selectively isolate their respective dispensing head from the nitrogen reservoir; and a dispenser controller;

wherein when one of the head switches is activated the dispenser controller opens the head valve of the respective dispenser head and activates the respective beverage pump, putting the dispenser head in fluid communication with the respective beverage reservoir, and following a timed delay the controller opens the nitrogen injector of the respective dispensing head, placing the nitrogen reservoir in fluid communication with the respective dispensing head.

2. The system of claim 1, further comprising:

wherein when the respective head switch is deactivated, the dispenser controller closes the dispensing solenoid operated valve, beverage solenoid operated valve and nitrogen injector of the respective dispensing head and stops the beverage pump of the respective dispensing head.

3. The system of claim 1 further comprising:

a water supply with a solenoid operated valve configured to selectively place the water supply in fluid communication with the dispensing conduits, a cleaner controller, wherein the cleaner controller is configured to, upon activation, communicate with the dispenser controller to lock out head switch control and nitrogen injection; the cleaner controller will then confirm water, detergent, and sanitizer reservoir are available, open the dispensing solenoid operated valve, open the water supply solenoid operated valve to flush the dispensing conduits for a predetermined length of time, then closes the water supply solenoid operated valve and open the detergent solenoid operated valve to allow detergent infused water to fill the dispensing conduit for a predetermined length of time, then close the dispensing solenoid operated valve, and the detergent solenoid operated valve, then after a predetermined length of time open the dispensing solenoid operated valve and the water supply solenoid operated valve for a predetermined time, then close the water supply solenoid operated valve and open the sanitizer solenoid operated valve for a predetermined length of time, then close the dispensing solenoid operated valve and the sanitizer solenoid operated valve, then after a predetermined length of time open the dispensing solenoid operated valve for a predetermined length of time, then close the dispensing solenoid operated valve.

4. The system of claim 3 further comprising:

a magnetic operated switch located on the dispensing head, and a shield, wherein when the shield is mounted adjacent to one of the dispensing heads, it blocks access to the dispensing head and triggers the magnetic operated switch allowing for the dispenser controller to know and to communicate shield presence to the cleaning controller.

5. The system of claim 3 further comprising:

a full sensor and an empty sensor on the sanitizer reservoir; and a solenoid operated water supply valve controlled by the cleaning controller configured to selectively put the water supply in fluid communication with the sanitizer reservoir.

6. The system of claim 5 further comprising:

a sanitizer storage bin connected to the sanitizer reservoir, and an auger mechanism controlled by the cleaning controller;

wherein the auger mechanism is capable of moving sanitizer from the sanitizer storage bin to the sanitizer reservoir.

7. The system of claim 6 further comprising:

an agitator located in the sanitizer reservoir and controlled by the cleaning controller;

wherein the when the empty sensor does not sense the presence of a liquid in the sanitizer reservoir, the cleaning controller adds water to the sanitizer reservoir by opening the water supply valve for the sanitizer reservoir, adds sanitizer by operating the auger mechanism and mixes the sanitizer and water by operating the agitator; and wherein when the full sensor senses liquid in the sanitizer reservoir the cleaning controller closes the water supply valve and stops operation of the auger mechanism and agitator.

8. The system of claim 3 further comprising:

a full sensor on the detergent reservoir;

a container of detergent concentrate and a pump controlled by the cleaning controller and capable of pumping detergent concentrate from the detergent concentrate container to the detergent reservoir; and a solenoid operated water supply valve controlled by the cleaning controller configured to selectively put the water supply in fluid communication with the detergent reservoir;

wherein the cleaning controller adds water to the detergent reservoir by opening the water supply valve for the detergent reservoir and fills the detergent reservoir with water until the level reaches the full sensor which then triggers the controller to close the water fill solenoid and turn on the detergent concentrate pump for a predetermined amount of time and then shuts off the detergent concentrate pump.

9. The system of claim 8 further comprising:

a level sensor on the detergent concentrate container;

wherein the cleaner controller halts operation of the system when the level sensor on the detergent concentrate container does not sense liquid in the detergent concentrate container.

10. The system of claim 3 further comprising:

a water reservoir;

a high level sensor on the water reservoir; and a solenoid operated water supply valve controlled by the cleaning controller configured to selectively put the water supply in fluid communication with the water reservoir;

wherein if the high level sensor senses liquid in the water reservoir the cleaning controller closes the water supply valve.

* * * * *